United States Patent [19]

Iwasaki

[11] Patent Number: 4,644,396

[45] Date of Patent: Feb. 17, 1987

[54] GATE CIRCUIT FOR CENTRAL CONTROL OF CATV SYSTEM

[75] Inventor: Satoshi Iwasaki, Tokyo, Japan

[73] Assignee: Pioneer Electronic Corporation, Japan

[21] Appl. No.: 737,643

[22] Filed: May 24, 1985

[30] Foreign Application Priority Data

May 24, 1984 [JP] Japan .................... 59-106162

[51] Int. Cl.⁴ .................... H04N 7/167; H04N 7/16
[52] U.S. Cl. .................... 380/6; 380/9
[58] Field of Search .................... 358/114, 118, 124; 307/98, 99

[56] References Cited

U.S. PATENT DOCUMENTS 3,989,887 11/1976 Murphy .................... 358/114
4,581,637 4/1986 Stender .................... 358/114 X Primary Examiner—Stephen C. Buczinski
Assistant Examiner—Linda J. Wallace
Attorney, Agent, or Firm—Sughrue, Mion, Zinn, Macpeak and Seas

[57] ABSTRACT

A gate circuit for use in switching an interference signal in a CATV system whereby the output impedance of the gate circuit is constant, independent of the switching state of the gate circuit. The inventive gate circuit includes input and output transformers, an interference signal being applied to a primary of the input transformer and the secondary of the output transformer being coupled to one input of a coupler receiving as another input an unjammed television signal. A first diode switching circuit controls a signal path between a secondary of the input transformer and the primary of the output transformer in response to an interference control signal. An impedance element having an impedance equal to the characteristic impedance of the transmission lines and the like of the CATV system is connected to the output terminal of the gate circuit via a second diode switching circuit operating in response to the interference control signal for electrically coupling the impedance element to the output terminal when the signal path between the input transformer and the primary of the output transformer is open.

3 Claims, 14 Drawing Figures

GATE CIRCUIT FOR CENTRAL CONTROL OF CATV SYSTEM

BACKGROUND OF THE INVENTION

The present invention relates to a gate circuit employed in a central control unit of a CATV system. More particularly, the invention relates to such a gate circuit in a central control unit of a type in which unauthorized viewing of designated television channels is blocked by the use of an interference signal superimposed on the television signal to be jammed.

In this type of system, because the interference signal is superimposed on the television signal to be jammed at a distribution unit, there is an advantage over the conventional jamming system, trap system, or addressable terminal system in that it is relatively inexpensive, provides a sufficient jamming effect, and provides a picture signal of good quality (for unjammed or authorized channels) since there are no scrambling signals mixed with authorised channels which have to be removed.

In the type of viewing control system to which the invention pertains, a gate circuit is provided for controlling the flow of the interference signal to a coupler which, when the interference signal is received thereat, adds it to the television signal in the frequency band of the unauthorized channel. Such a gate circuit is shown in the schematic view of FIG. 1.

A group of television signals transmitted from a brancher is amplified by an amplifier 3, and then applied to a distributor 4. One of the outputs of the distributor 4 is applied to the input of a coupler 9, and from there the signal is supplied to a terminal unit in the subscriber's home. A control signal Vt is applied to a jamming generator 5 (implemented, for instance, with a variable frequency oscillator) from a jamming controller 6, the latter receiving a control signal from the control center 1. The jamming generator 5 produces an interference signal fJ at a frequency determined by the value of the signal Vt. The jamming controller outputs a signal Vg which controls the opening and closing of a gate circuit 8. Thus, the flow of the interference signal from the jamming generator, fed via a distributor 7, to the coupler 9 is controlled.

The frequency of the interference signal fJ, which is preferably about 200 KHz from the video carrier of the channel to be jammed, is changed in time sequence in steps of 6 MHz, corresponding to the standard channel spacing. That is, as shown in FIG. 2, during the time period from t1 to t2, the signal fJ is at a level Vt1, changing to a level of Vt2 at time t2 in an extremely short time period Δt. This process continues until the level of fJ reaches Vt5 in this example, and then returns to Vt1. This repeats cyclically. As shown in FIG. 3, the signal Vg takes two values, a voltage value Vgo rendering the gate 8 open and a value Vgc rendering the gate 8 closed. The resulting frequency spectrum of the interference signal fJ is shown in FIG. 5, ranging between fJ1 and fJ5.

It is assumed that television channel signals at video frequencies fv1, fv3, fv8, and fv11 are to be jammed. To do this, the interference signal is gated on in the intervals when it is at the frequencies fJ1, fJ2, fJ4, and fJ5, which are spaced in frequency by about 200 KHz from fv1, fv3, fv8, and fv11, respectively. For other channels, the interference signal is gated off in the corresponding time periods, thereby greatly attenuating the interference signal in those time periods, as shown in FIG. 4. The frequency spectrum for the interference signal fJ for this case is shown in FIG. 6.

When the frequency of the interference signal fJ is being changed, some energy from this signal unavoidably falls within the band of television channel signals which are not intended to be jammed. To avoid interference with these television signals, as shown in FIG. 7, the gate circuit 8 is opened at each frequency transition time of the interference signal for a short time α on either side of the center of the transition period. For instance, assuming that fv3 is to be jammed, the gate circuit 8 is closed in the period t3−α to t3+α. Accordingly, only components at frequencies fJ1, fJ2, fJ4 and fJ5 are superimposed on the output television signal applied through the coupler 9. The frequency spectrum of the output television signal is shown in FIG. 8.

The structure of the conventional gate circuit is shown in FIG. 9. The interference signal fJ is applied via a terminal 20 to the primary of an input transformer 10, and the control signal Vg is applied via a terminal 21 to a switching voltage generator 19. The input transformer 10 divides the interference signal into positive and negative components at its output secondary windings, which have first terminals connected to diodes 12 and 13, respectively. The attenuation of each of the diodes 12 and 13 to high-frequency signals is determined by the polarity of the anode-cathode voltage across the diode. A constant DC voltage Vc on a terminal 23 is divided by resistors 14 and 15, and the divided voltage is applied to the cathodes of the diodes 12 and 13 via the primary of an output transformer 11. The output of the switching voltage generator 19 is one of two values, Vgc or Vgo, depending upon the value of the signal Vg applied at its input. The output of the switching voltage generator 19 is applied through resistors 16 and 17 to the other terminals of the secondary windings of the transformer 10 and thence to the anodes of the respective diodes 12 and 13. The voltages Vgc and Vgo are determined relative to the DC voltage at the terminal 23 so as to oppositely set the polarity of the DC voltage across the diodes 12 and 13, thus controlling the flow of the television signals between the input transformer 10 and the output transformer 11. That is, when the switching signal generator 19 outputs a voltage of Vgo, the diodes 12 and 13 are reverse biased, and hence the television signal is prevented from being applied to the output transformer 11, while when the switching signal generator 19 outputs a voltage of Vgc, the diodes 12 and 13 are forward biased, and hence the television signal is applied to the output transformer 11.

In FIG. 9, reference numeral 18 indicates a capacitor providing an AC path between the center terminals of the secondary windings of the input transformer 10.

When the circuit of FIG. 9 is used in the viewing control system of FIG. 1, however, a difficulty arises. Specifically, when the gate circuit 8 is in the closed state, the impedance Z at the output of the gate circuit 8 seen by the coupler 9 is that of the distributor 7, which is appropriately matched to that of the transmission lines and other components of the system, and hence no problem arises. However, when the gate circuit 8 is in the open state, the impedance seen by the coupler 9 is infinite; that is, an unmatched impedance is seen by the coupler 9. Therefore, if a channel having a video frequency fv6 is not to be jammed with the corresponding jamming signal fJ3 between times t3 and t4 as indicated in FIGS. 10 and 11, an open impedance is seen by the coupler 9 in the time period of t3 and t4, as depicted in FIG. 12. Accordingly, the signal level of the television signal at the output of the coupler 9 changes as shown in FIG. 13, which has undesirable effects on the quality of the television signal received at the subscriber's terminal unit.

SUMMARY OF THE INVENTION

Accordingly, it is an object of the present invention to provide a gate circuit in which the drawbacks of the conventional gate circuit described above have been eliminated. More specifically, it is an object of the present invention to provide a gate circuit for use in switching an interference signal in a CATV system whereby the output impedance of the gate circuit is constant, independent of the switching state of the gate circuit.

These as well as other objects of the invention are met by a gate circuit for an interference signal in a CATV system including input and output transformers, an interference signal being applied to a primary of the input transformer and the secondary of the output transformer being coupled to one input of a coupler receiving as another input an umjammed television signal, first switching means for controlling a signal path between a secondary of the input transformer and the primary of the output transformer in response to an interference control signal, an impedance element having an impedance equal to the characteristic impedance of the transmission lines and the like of the CATV system, and second switching means operating in response to the interference control signal for coupling the impedance element across the secondary of the output transformer when the signal path between the secondary of the input transformer and the primary of the output transformer is open.

DESCRIPTION OF THE PREFERRED EMBODIMENTS

Figure 1:
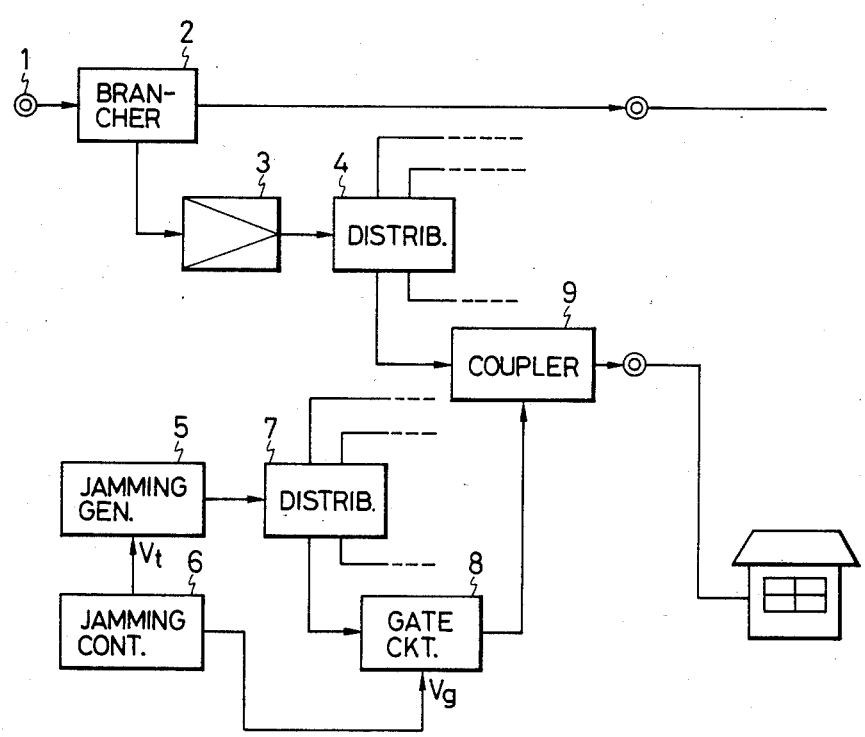
FIG. 1 is a block diagram of a centralized viewing control system in which a gate circuit of the invention can be used to advantage.
Figure 2:
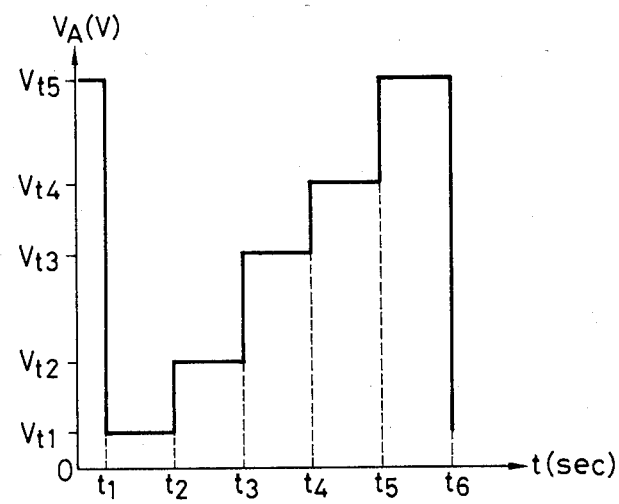
FIGS. 2 through 8 and 10 through 13 are waveform diagrams used to explain the operation of a conventional gate circuit and its drawbacks.
Figure 3:
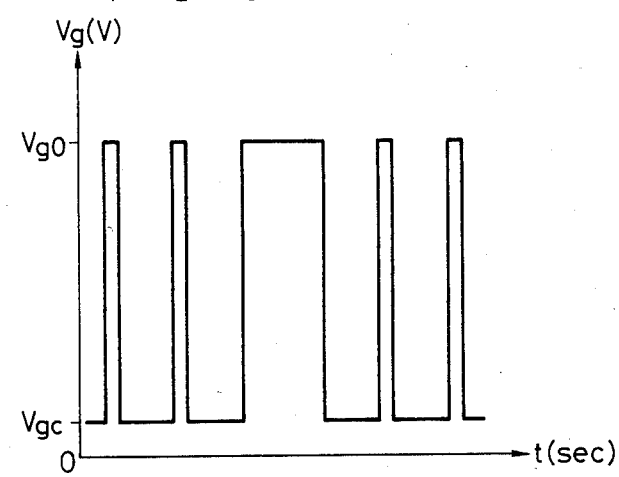
Figure 4:
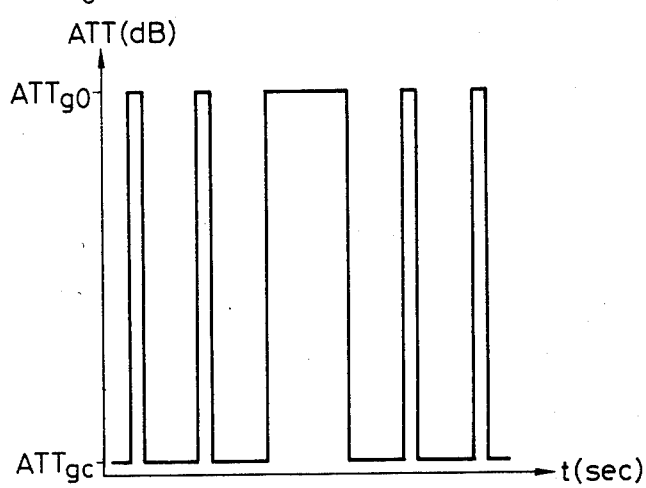
Figure 5:
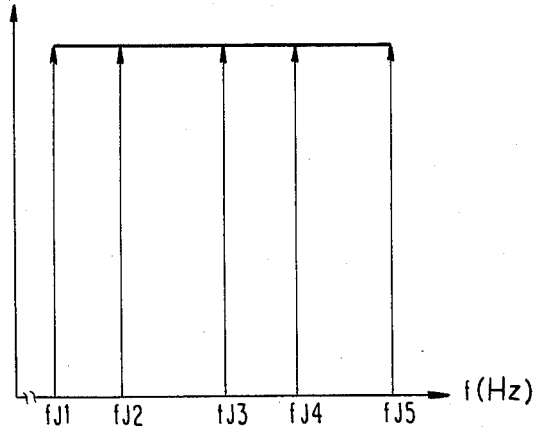
Figure 6:
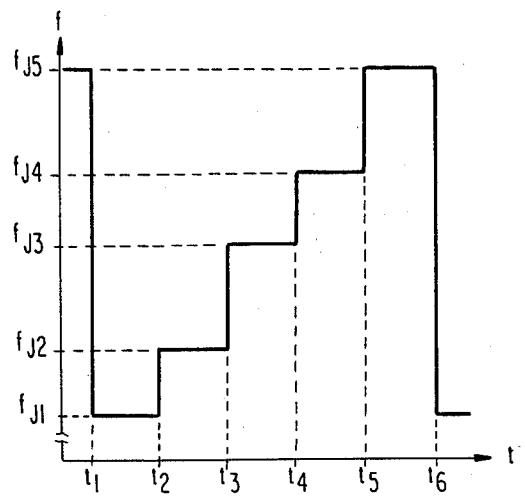
Figure 7:
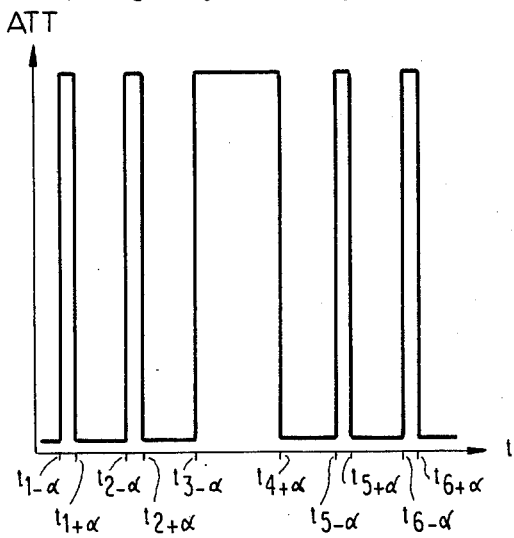
Figure 8:
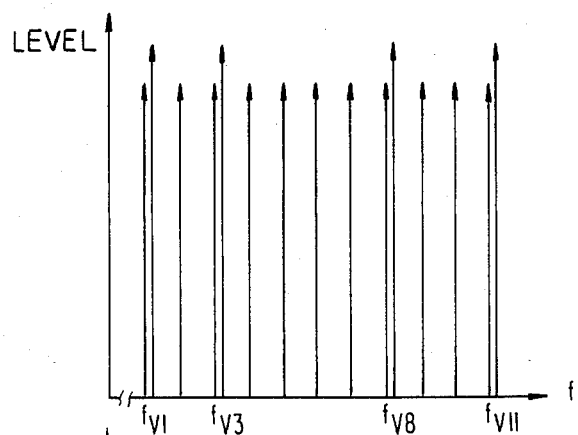
Figure 10:
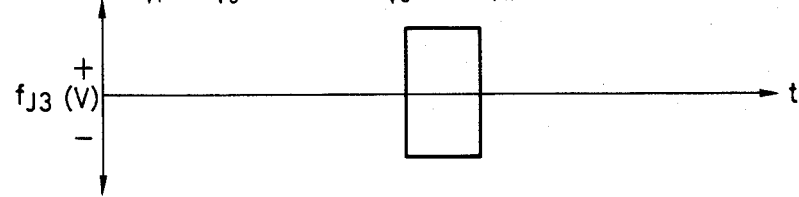
Figure 11:
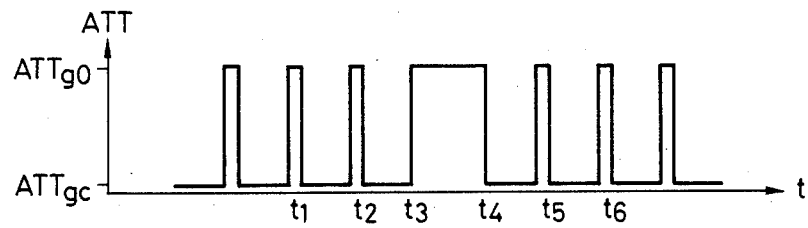
Figure 12:
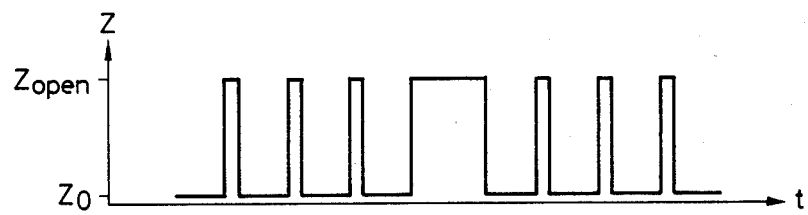
Figure 13:
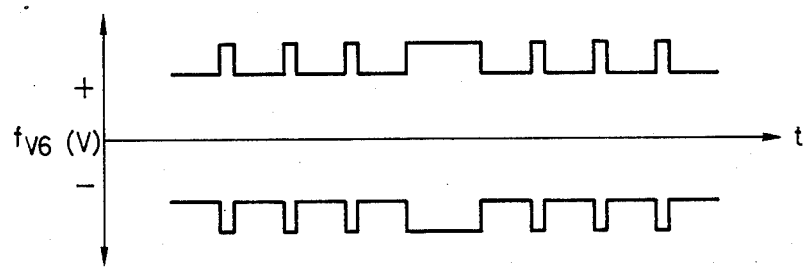
Figure 9:
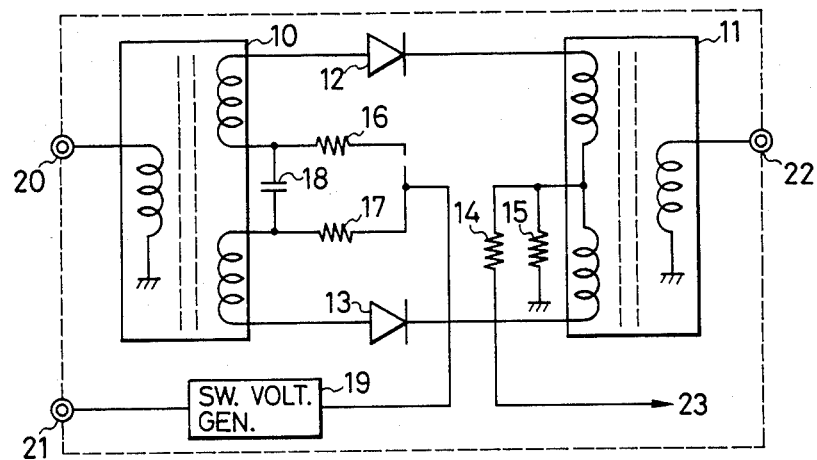
FIG. 9 is a schematic diagram of a conventional gate circuit.
Figure 14:
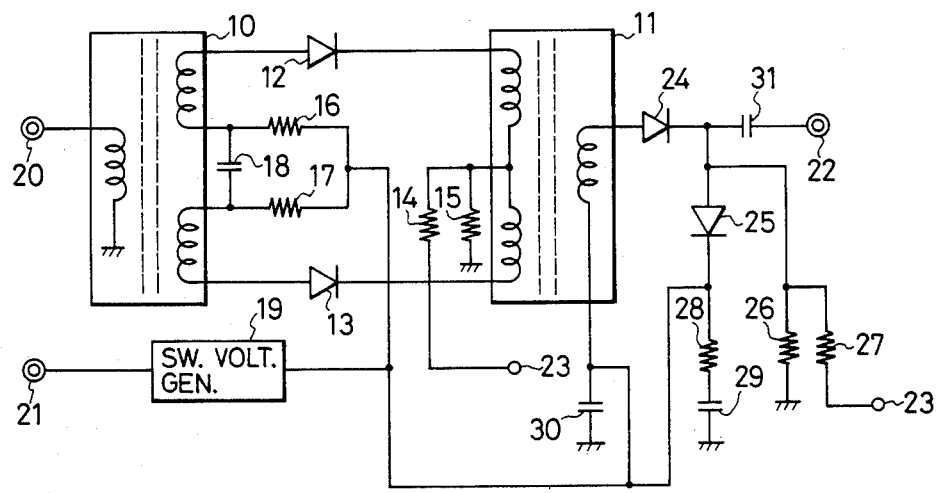
FIG. 14 is a schematic diagram of a gate circuit of the invention.

FIG. 14 is a schematic diagram of a gate circuit of the invention. In FIG. 14, reference numerals used commonly in FIG. 9 identify like components, and a further detailed description of those components will hence be omitted.

In FIG. 14, a resistor 28 has an impedance Z0 equal to the characteristic impedance of the transmission lines, etc., of the CATV system. One terminal of the resistor 28 is connected to ground via a capacitor 29, while the other terminal is connected to the cathode of a diode 25, one terminal of the secondary of the output transformer 11, and the output of the switching voltage generator 19. The anode of the diode 25 is coupled to the cathode of another diode 24, the anode of which is connected to the other terminal of the secndary of the output transformer 11. The junction point of the diodes 24 and 25 is connected to the junction point of a voltage divider formed by resistors 26 and 27, the other terminals of the voltage point being connected between the terminal 23 receiving the DC voltage and ground. A capacitor 31 is connected between the junction point of the diodes 24 and 25 and the output terminal 22.

When the output of the switching voltage generator 19 is Vgc, as mentioned above, the diodes 12 and 13 are in their low-impedance states, providing a signal path for the interfering signal between the secondary of the input transformer 10 and the primary of the output transformer 11. In this case, the diode 25 is biased reversely and hence is in its high-impedance state so that the no effect is seen at the output terminal 22 of the resistor 28. That is, the impedance seen at the output of the gate circuit is determined by the impedance of the elements connected to the input terminal 20, namely, the characteristic impedance of the transmission lines. The interference signal is thus applied to the output terminal 22 via the diode 24 and capacitor 31. On the other hand, when the output of the switching voltage generator 19 is Vgo, the diodes 12 and 13 are placed in their high-impedance state, blocking the path of the interference signal. In this case, the diode 25 is forwardly biased, connecting the resistor 28 between the output terminal 22 and ground via the capacitors 29 and 31. Accordingly, the impedance seen by the coupler 9 in this state is that of the resistor 28, namely, the same characteristic impedance as in the other state where the output of the switching voltage generator is Vgc. Therefore, in all cases the impedance seen by the coupler 9 in the direction of the gate circuit 8 is the characteristic impedance, and thus the level of the television signal at the output of the coupler 9 is maintained constant.

This completes the description of the preferred embodiment of the present invention. Although a preferred embodiment has been described, it is believed that numerous modifications and alterations thereto would be apparent to one or ordinary skill in the art without departing from the spirit and scope of the invention.

I claim:

1. A gate circuit for an interference signal in a CATV system comprising: input and output transformers, an interference signal being applied to a primary of said input transformer and a secondary of said output transformer being coupled to one input of a coupler receiving as another input an unjammed television signal; first switching means for controlling a signal path between a secondary of said input transformer and a primary of said output transformer in response to an interference control signal; an impedance element having an impedance equal to a characteristic impedance of transmission lines of said CATV system; and second switching means operating in response to said interference control signal for coupling said impedance element across said secondary of said output transformer when said signal path between said secondary of said input transformer and said primary of said output transformer is open.

2. The gate circuit of claim 1, wherein said first and second switching means each comprise diode means.

3. The gate circuit of claim 2, further comprising means for reverse biasing said diode means of said first switching means when said diode means of said second switching means is conductive, and means for reverse biasing said diode means of said second switching means when said diode means of said first switching means is conductive.

* * * * *